(12) United States Patent
Koshiba

(10) Patent No.: US 8,866,954 B2
(45) Date of Patent: Oct. 21, 2014

(54) DIGITAL CAMERA

(71) Applicant: FUJIFILM Corporation, Tokyo (JP)

(72) Inventor: Masaaki Koshiba, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/191,578

(22) Filed: Feb. 27, 2014

(65) Prior Publication Data

US 2014/0176780 A1 Jun. 26, 2014

Related U.S. Application Data

(63) Continuation of application No. PCT/JP2012/071958, filed on Aug. 30, 2012.

(30) Foreign Application Priority Data

Sep. 22, 2011 (JP) ................................. 2011-207576

(51) Int. Cl.
| | |
|---|---|
| G03B 27/10 | (2006.01) |
| G03B 13/00 | (2006.01) |
| H04N 5/225 | (2006.01) |
| H04N 5/369 | (2011.01) |
| H04N 13/02 | (2006.01) |
| G02B 7/34 | (2006.01) |
| H04N 5/232 | (2006.01) |
| H04N 9/04 | (2006.01) |
| H04N 9/64 | (2006.01) |
| G02B 27/40 | (2006.01) |
| H04N 5/355 | (2011.01) |

(52) U.S. Cl.
CPC .............. *G02B 27/40* (2013.01); *H04N 5/3696* (2013.01); *H04N 13/0296* (2013.01); *G02B 7/34* (2013.01); *H04N 5/23212* (2013.01); *H04N 9/045* (2013.01); *H04N 13/0257* (2013.01); *H04N 9/646* (2013.01); *H04N 13/0207* (2013.01); *H04N 5/35563* (2013.01)
USPC ............................ 348/345; 348/349; 348/361

(58) Field of Classification Search
None
See application file for complete search history.

(56) References Cited

U.S. PATENT DOCUMENTS

| 8,466,998 B2 | 6/2013 | Suzuki | |
|---|---|---|---|
| 2006/0028577 A1* | 2/2006 | Honjo et al. | ................... 348/345 |

(Continued)

FOREIGN PATENT DOCUMENTS

| JP | 2003-007994 | 1/2003 |
|---|---|---|
| JP | 2007-158597 A | 6/2007 |

(Continued)

OTHER PUBLICATIONS

International Preliminary Report on Patentablility issued in PCT/JP2012/071958, dated Apr. 3, 2014.
International Search Report issued in PCT/JP2012/071958, dated Nov. 6, 2012.

*Primary Examiner* — Lin Ye
*Assistant Examiner* — Euel Cowan
(74) *Attorney, Agent, or Firm* — Birch, Stewart, Kolasch & Birch, LLP

(57) ABSTRACT

A solid-state imaging device has normal pixels, first phase difference pixels, and second phase difference pixels. "R", "G", and "B" denote colors of color filters provided for the respective pixels. A color dependence characteristic calculator averages output signals from the normal pixels located at the center of a screen, on a color basis, and thereby calculates average output signals. A color determination section determines a main color of a subject, out of three primary colors, based on the average output signals. An AF controller performs focus adjustment of a taking lens based on the output signals of the determined main color, out of the output signals from the first phase difference pixels and the second phase difference pixels.

16 Claims, 10 Drawing Sheets

(56) References Cited

U.S. PATENT DOCUMENTS

| | | | |
|---|---|---|---|
| 2006/0262659 A1* | 11/2006 | Kurosawa | 369/1 |
| 2008/0204565 A1* | 8/2008 | Yumiki | 348/208.99 |
| 2012/0033120 A1 | 2/2012 | Nakamura et al. | |

FOREIGN PATENT DOCUMENTS

| | | |
|---|---|---|
| JP | 2008-312073 | 12/2008 |
| JP | 2009-17152 A | 1/2009 |
| JP | 2009-157198 A | 7/2009 |

* cited by examiner

DIGITAL CAMERA

CROSS REFERENCE TO RELATED APPLICATIONS

This application is a Continuation of PCT International Application No. PCT/JP2012/071958 filed on Aug. 30, 2012, which claims priority under 35 U.S.C 119(a) to Application No. 2011-207576 filed Sep. 22, 2011 in Japan, all of which are hereby expressly incorporated by reference into the present application.

BACKGROUND OF THE INVENTION

1. Field of the Invention

The present invention relates to a digital camera for performing automatic focus adjustment of a phase detection method.

2. Description Related to the Prior Art

Most digital cameras comprise an autofocus device (AF device) for performing automatic focus adjustment. The AF device checks an image forming state of a taking lens and moves a focus lens, which is a part or the entire of the taking lens, to clearly form an image of a main subject on an imaging surface of a solid-state imaging device such as a CCD or a CMOS.

There are AF devices of contrast detection method and AF devices of phase detection method. In the contrast detection method, a lens position for maximizing an integrated value of differences between signals from adjacent pixels is determined as an in-focus position while the focus lens is moved in an optical axis direction. In the phase detection method, the in-focus position is obtained by detecting the presence or absence of a shift between incident positions of light passing through different portions of a taking lens and the magnitude of the shift. The contrast detection method is inexpensive because the focus is detected using a pixel signal obtained from the solid-state imaging device. The phase detection method allows fast AF control because a focus state is detected without moving the focus lens. However, with the need of a phase detection sensor, the phase detection method tends to be employed by expensive models.

For example, U.S. Patent Application Publication No. 2012/0033120 (corresponding to Japanese Patent Laid-Open Publication No. 2010-252277) and Japanese Patent Laid-Open Publication No. 2007-158597 disclose digital cameras comprising an AF device of a phase detection method. A solid-state imaging device provided with two types of phase difference pixels (first and second phase difference pixels) in addition to normal pixels, thereby eliminating the need for a special phase detection sensor, is also known (see U.S. Pat. No. 8,466,998 (corresponding to Japanese Patent Laid-Open Publication No. 2008-312073), Japanese Patent Laid-Open Publication No. 2009-157198, and Japanese Patent Laid-Open Publication No. 2009-017152). The normal pixel has a normal opening section located above the center of a light receiving surface of a photodiode. The normal pixel photoelectrically converts light incident thereon through the normal opening section. The first phase difference pixel has a first off-center opening section that is shifted in a first direction relative to the center position of a light receiving surface of a photodiode. The second phase difference pixel has a second off-center opening section that is shifted in a second direction opposite to the first direction.

The normal opening sections, the first off-center opening sections, and the second off-center opening sections are formed through a light-shield film for covering a semiconductor substrate in which the photodiodes are formed. The size of each of the first and second off-center opening sections is smaller than the size of the normal opening section.

The phase difference pixel is highly sensitive to light incident from an oblique direction relative to a center line of a pixel. For example, the first phase difference pixel is highly sensitive to the light incident from upper right. The second phase difference pixel is highly sensitive to light incident from upper left.

An image obtained from the first phase difference pixels and an image obtained from the second phase difference pixels are shifted in a right-left direction in accordance with a focus state of the taking lens. An amount of shift between the two images corresponds to an amount of shift of the focus of the taking lens. The two images coincide and the amount of shift is zero when the taking lens is in focus. The amount of shift increases as the taking lens is further out of focus. Hence, a focus adjustment amount of the taking lens is calculated by detecting the direction of the shift of each image and the amount of shift between the images obtained from the first and second phase difference pixels.

In the solid-state imaging device disclosed in the U.S. Pat. No. 8,466,998, the Japanese Patent Laid-Open Publication No. 2009-157198, and the Japanese Patent Laid-Open Publication No. 2009-017152, color filters are provided for the first and second phase difference pixels and the normal pixels. The digital camera comprising the solid-state imaging device uses all of the normal pixels, the first phase difference pixels, and the second phase difference pixels to capture a normal image.

In the above-described solid-state imaging device, the first and the second phase difference pixels have the color filters. Hence, output levels from the first and second phase difference pixels significantly decrease depending on a color of a subject. As a result, the focus adjustment amount cannot be obtained accurately. For example, in a case where the first and the second phase difference pixels have color filters of three colors, red, green, and blue, output levels of the first and second phase difference pixels with the green and the blue color filters are low when an image of a red subject is captured.

SUMMARY OF THE INVENTION

An object of the present invention is to provide a digital camera capable of accurate focus adjustment even for a subject with a biased hue.

In order to achieve the above object, the digital camera of the present invention comprises a taking lens, a solid-state imaging device, a color dependence characteristic calculator, a color determination section, an autofocus detector, and a focus mechanism. The taking lens forms an image of a subject. The solid-state imaging device has an imaging surface on which three types of pixels are arranged. The three types of pixels are a plurality of normal pixels having sensitivity not dependent on an incident direction of light, a plurality of first phase difference pixels highly sensitive to light of a first incident direction, and a plurality of second phase difference pixels highly sensitive to light of a second incident direction opposite to the first incident direction. The each pixel has a color filter of one of at least three primary colors. The color dependence characteristic calculator performs calculation of one of or both of output signals from the normal pixels and output signals from the first and the second phase difference pixels, on a color basis, to calculate a color dependence characteristic of the output signal, after a color image of the subject is captured. The color determination section determines a specific color based on the color dependence characteristic. The autofocus detector obtains a focus adjustment amount of the taking lens based on the output signal from the pixel having the color filter of the specific color, out of the first and the second phase difference pixels. The focus mechanism sets the taking lens to an in-focus position in accordance with the focus adjustment amount.

It is preferable that the color dependence characteristic calculator averages the output signals from the pixels, for each color of red, green, and blue constituting the three primary colors, to calculate a red average output signal $P_R$, a green average output signal $P_G$, and a blue average output signal $P_B$, and the specific color is determined from magnitude of output ratios between the average output signals of the two colors, $P_R/P_B$, $P_R/P_G$, and $P_B/P_G$. It is preferable that the color dependence characteristic calculator uses the output signal from the each pixel located in a center area of the imaging surface, to calculate the color dependence characteristic.

It is preferable that the digital camera comprises a normal image generator for producing a two-dimensional normal image based on the output signals from the normal pixels. It is preferable that the digital camera comprises a wide dynamic range image generator for producing a wide dynamic range image based on the output signals from the normal pixels and the output signals from the first and the second phase difference pixels, and a dynamic range of the wide dynamic range image is wider than a dynamic range of the normal image. It is preferable that the digital camera comprises a parallax image generator for producing a parallax image based on the output signals from the first and the second phase difference pixels.

It is preferable that the pixels on the imaging surface are arranged in pixel blocks of 2×2, and the each pixel block has the two normal pixels and the first and the second phase difference pixels. It is preferable that the three primary colors are a first color, a second color, and a third color, and the each pixel block has color filters of the same color.

It is preferable that the pixel blocks are categorized into six types: a first first-color pixel block, a second first-color pixel block, a first second-color pixel block, a second second-color pixel block, a first third-color pixel block, and a second third-color pixel block. The first first-color pixel block is composed of the two normal pixels arranged in a first diagonal direction and the first and the second phase difference pixels arranged in a second diagonal direction, and has the color filters of the first color. The second first-color pixel block has the first and the second phase difference pixels with their positions reversed from positions of the first and the second phase difference pixels in the first first-color pixel block. The first second-color pixel block is composed of the two normal pixels arranged in the first diagonal direction and the first and second phase difference pixels arranged in the second diagonal direction, and has the color filters of the second color. The second second-color pixel has the first and the second phase difference pixels with their positions reversed from positions of the first and the second phase difference pixels in the first second-color pixel block. The first third-color pixel block is composed of the two normal pixels arranged in the first diagonal direction and the first and the second phase difference pixels arranged in the second diagonal direction, and has the color filters of the third color. The second third-color pixel block has the first and the second phase difference pixels with their positions reversed from positions of the first and the second phase difference pixels in the first third-color pixel block.

It is preferable that the digital camera has first pixel block rows and second pixel block rows. It is preferable that the first pixel block rows and the second pixel block rows are arranged alternately in a column direction. The first pixel block row has the first first-color pixel block, the first second-color pixel block, the second first-color pixel block, and the second second-color pixel block repeatedly arranged in this order. The second pixel block row has the first second-color pixel block, the first third-color pixel block, the second second-color pixel block, the second third-color pixel block repeatedly arranged in this order. In this case, it is preferable that the first color is green, and the second color is blue, and the third color is red.

The normal pixels may be arranged at a predetermined pitch in odd-numbered rows. The first and the second phase difference pixels may be arranged at the predetermined pitch in even-numbered rows. The first and the second phase difference pixels may be arranged in positions shifted by a half pitch in a row direction relative to positions of the normal pixels.

In this case, it is preferable that the three primary colors are a first color, a second color, and a third color. It is preferable that the digital camera has first to fourth pixel rows repeatedly arranged in this order in the column direction. In the first pixel row, the normal pixels having the color filters of the first color and the normal pixels having the color filters of the second color are arranged alternately at the predetermined pitch. In the second pixel row, the first phase difference pixel having the color filter of the first color, the first phase difference pixel having the color filter of the second color, the second phase difference pixel having the color filter of the first color, and the second phase difference pixel having the color filter of the second color are repeatedly arranged in this order at the predetermined pitch. In the third pixel row, the normal pixels having the color filters of the second color and the normal pixels having the color filters of the third color are arranged alternately at the predetermined pitch. In the fourth pixel row, the first phase difference pixel having the color filter of the second color, the first phase difference pixel having the color filter of the third color, the second phase difference pixel having the color filter of the second color, and the second phase difference pixel having the color filter of the third color are repeatedly arranged in this order at the predetermined pitch. In this case, it is preferable that the first color is blue, the second color is green, and the third color is red.

It is preferable that each of the normal pixels, the first phase difference pixels, and the second phase difference pixels has a photodiode, a light-shield film, and a microlens disposed over the color filter. The light-shield film has a normal opening formed over the center of the photodiode of the normal pixel, a first off-center opening formed in a position shifted in one direction from above the center of the photodiode of the first phase difference pixel, and a second off-center opening formed in a position shifted in another direction, opposite to the one direction, from above the center of the photodiode of the second phase difference pixel.

The each normal pixel may have a photodiode, an opening formed through a light-shield film over the photodiode, and a microlens disposed over a center line of the opening. The each first phase difference pixel may have a photodiode, an opening formed through the light-shield film over the photodiode, and a microlens shifted in one direction from a center line of the opening and having a small diameter. The each second phase difference pixel may have a photodiode, an opening formed through the light-shield film over the photodiode, and a microlens shifted in another direction, opposite to the one direction, from a center line of the opening and having a small diameter.

According to the present invention, the calculation of one of or both of the output signals from the normal pixels and the output signals from the first and the second phase difference pixels is performed on a color basis, to calculate a color dependence characteristic of the output signal. One of the colors is determined based on the calculated color dependence characteristic. The focus adjustment amount is obtained based on the output signals from the first and the second phase difference pixels having the color filters of the same color as the determined color. Thus, the focus adjustment is performed accurately even for a subject with a biased or dominant hue.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
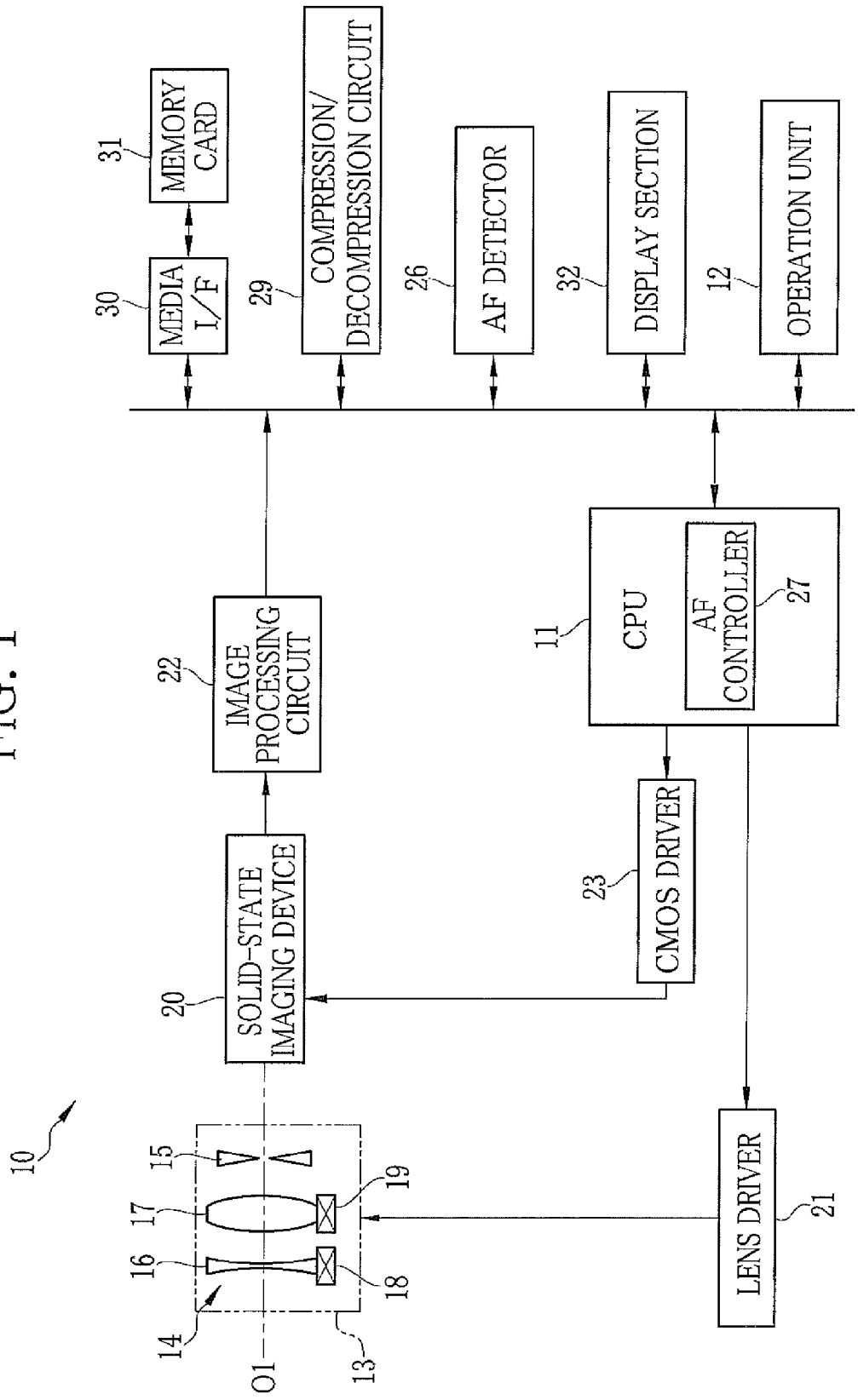
FIG. 1 is a block diagram of a digital camera.

In FIG. 1, a digital camera 10 has a CPU 11. The CPU 11 reads out various programs from a memory (not shown) and executes them sequentially based on a control signal from an operation unit 12. The operation unit 12 includes a shutter release button and various operation buttons. The CPU 11 controls each section of the digital camera 10.

The digital camera 10 has a normal imaging mode, a parallax imaging mode, and a wide dynamic range imaging mode (hereinafter referred to as the wide DR imaging mode). In the normal imaging mode, a normal image (two-dimensional still image) is produced. In the parallax imaging mode, a parallax image for stereoscopic viewing is produced. In the wide DR imaging mode, a wide dynamic range image (hereinafter referred to as the wide DR image) with a dynamic range wider than that of the normal image is produced. The operation unit 12 is used to switch the imaging mode of the digital camera 10.

A lens unit 13 incorporates a taking lens 14 and a mechanical shutter 15. The taking lens 14 includes a variable power lens 16 and a focus lens 17. The variable power lens 16 and the focus lens 17 are driven by a variable power mechanism 18 and a focus mechanism 19, respectively, and moved in a direction of an imaging optical axis O1. Operations of the mechanical shutter 15, the variable power mechanism 18, and the focus mechanism 19 are controlled by the CPU 11 through a lens driver 21. When zoomed, the variable power lens 16 and the focus lens 17 move in an optical axis direction. When the focus is adjusted, the focus lens 17 moves in the optical axis direction. Note that the focus may be adjusted by moving the entire taking lens 14.

The mechanical shutter 15 has a shutter blade (not shown). The shutter blade moves between a closed position and an open position. In the closed position, the shutter blade blocks subject light from entering a solid-state imaging device 20. In the open position, the shutter blade allows the incidence of the subject light. The mechanical shutter 15 moves the shutter blade to the open or closed position to open or block a light path from the taking lens 14 to the solid-state imaging device 20. The lens unit 13 includes an aperture stop (not shown) for controlling a light amount of the subject light incident on the solid-state imaging device 20.

The solid-state imaging device 20 is a CMOS-type image sensor, which converts the subject light from the taking lens 14 into an electric signal and outputs the electric signal. A CMOS driver 23 controls the drive of the solid-state imaging device 20 under the control of the CPU 11.

An image processing circuit 22 performs various processes such as gradation conversion, white balance correction, and gamma correction on an imaging signal from the solid-state imaging device 20 and thereby produces image data. In the normal imaging mode, the image processing circuit 22 produces a normal image from the image data which has been subjected to the image processing. In the parallax imaging mode, the image processing circuit 22 produces a parallax image composed of an L viewpoint image and an R viewpoint image. In the wide DR imaging mode, the image processing circuit 22 produces a wide DR image. In each imaging mode, the image processing circuit 22 produces L focus detection image data and R focus detection image data for focus adjustment.

Based on the L focus detection image data and the R focus detection image data, an AF detector 26 calculates a focus adjustment amount (defocus amount) for focusing the taking lens 14. Based on the focus adjustment amount, calculated by the AF detector 26, an AF controller 27 of the CPU 11 moves the focus lens 17 through the lens driver 21. Thus the focus adjustment is performed. Note that a sign of the focus adjustment amount determines a direction for moving the focus lens 17.

A compression/decompression circuit 29 compresses image data, of each image, processed in the image processing circuit 22. The compression/decompression circuit 29 decompresses the compressed image data read out from a memory card 31 through a media I/F 30. The media I/F 30 records each image data on the memory card 31 and reads out each image data from the memory card 31. A display section 32 is a liquid crystal display or the like. The display section 32 displays through images (live view images), reproduced images, or the like. The display section 32 displays a stereoscopic image when a parallax image is captured.

Figure 2:
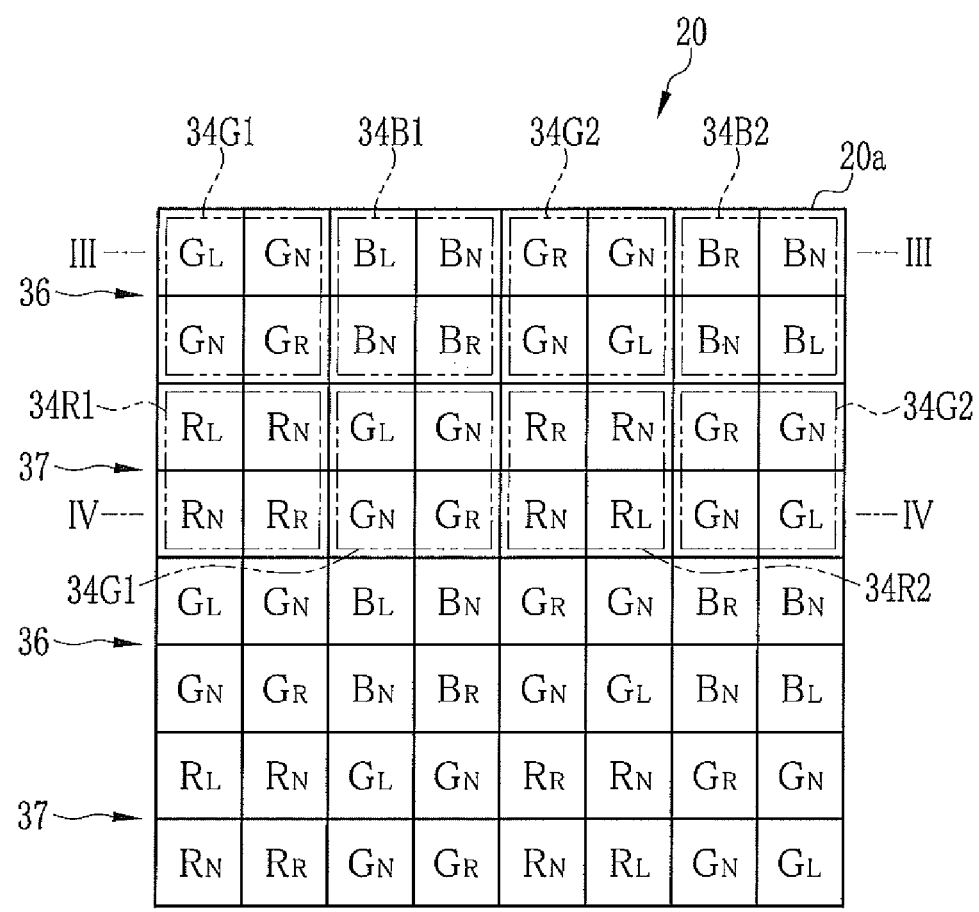
FIG. 2 is a plan view of a solid-state imaging device.

In FIG. 2, normal pixels $R_N$, $G_N$, and $B_N$, first phase difference pixels $R_L$, $G_L$, and $B_L$, second phase difference pixels $R_R$, $G_R$, and $B_R$ are disposed in an imaging surface 20a of the solid-state imaging device 20. These pixels are arranged in a square matrix. Here, "R", "G", and "B" denote three primary colors of the color filters provided for the respective pixels. The "R" represents red. The "G" represents green. The "B" represents blue. Each pixel selectively receives light of wavelengths corresponding to the color of the color filter.

The normal pixels $R_N$, $G_N$, and $B_N$ are used to produce normal image (still image) data in the normal imaging mode. The sensitivities of the normal pixels $R_N$, $G_N$, and $B_N$ are not dependent on directions of the incident light. Note that the normal pixels $R_N$, $G_N$, and $B_N$ located in a center portion of a screen, of all the normal pixels $R_N$, $G_N$, and $B_N$, are used also for determining a color in autofocusing.

The first phase difference pixels $R_L$, $G_L$, and $B_L$ and the second phase difference pixels $R_R$, $G_R$, $B_R$ are used to produce parallax image data and focus detection image data. Sensitivities of the first phase difference pixels $R_L$, $G_L$, and $B_L$ and sensitivities of the second phase difference pixels $R_R$, $G_R$, and $B_R$ are dependent on directions of the incident light. The first phase difference pixels $R_L$, $G_L$, and $B_L$ are highly sensitive to the incident light of a specific direction. The second phase difference pixels $R_R$, $G_R$, and $B_R$ are highly sensitive to the incident light of a direction which differs from the specific direction.

Each of a first R pixel block 34R1, a second R pixel block 34R2, a first G pixel block 34G1, a second G pixel block 34G2, a first B pixel block 34B1, and a second B pixel block 34B2 is composed of four pixels in a square matrix of 2×2.

The first R pixel block 34R1 has two normal pixels $R_N$ arranged in a first diagonal direction (direction from upper right to lower left) and a first phase difference pixel $R_L$ and a second phase difference pixel $R_R$ arranged in a second diagonal direction (from upper left to lower right). The second R pixel block 34R2 is the same as the first R pixel block 34R1 except that the positions of the first phase difference pixel $R_L$ and the second phase difference pixel $R_R$ are reversed from those in the first R pixel block 34R1.

The first G pixel block 34G1 has two normal pixels $G_N$ arranged in the first diagonal direction and a first phase difference pixel $G_L$ and a second phase difference pixel $G_R$ arranged in the second diagonal direction. The second G pixel block 34G2 is the same as the first G pixel block 34G1 except that the positions of the first phase difference pixel $G_L$ and the second phase difference pixel $G_R$ are reversed from those in the first G pixel block 34G1.

The first B pixel block 34B1 has two normal pixels $B_R$ arranged in the first diagonal direction and a first phase difference pixel $B_L$ and a second phase difference pixel $B_R$ arranged in the second diagonal direction. The second B pixel block 34B2 is the same as the first B pixel block 34B1 except that the positions of the first phase difference pixel $B_L$ and the second phase difference pixel $B_R$ are reversed from those in the first B pixel block 34B1.

The first G pixel block 34G1, the first B pixel block 34B1, the second G pixel block 34G2, and the second B pixel block 34B2 are repeatedly arranged in this order in a row direction to constitute a first pixel block row 36. The first R pixel block 34R1, the first G pixel block 34G1, the second R pixel block 34R2, and the second G pixel block 34G2 are repeatedly arranged in this order in the row direction to constitute a second pixel block row 37. The first pixel block rows 36 and the second pixel block rows 37 are arranged alternately in a column direction.

Each pixel of the solid-state imaging device 20 is provided with a pixel circuit (not shown) as is well-known. The pixel circuit converts a signal charge, which is stored in a photodiode 41 (see FIGS. 3 and 4) of each pixel, into a signal voltage and outputs the signal voltage. The solid-state imaging device 20 is provided with a plurality of drive lines (not shown) for driving the pixel circuits and a plurality of signal lines (not shown) for reading out the signal voltages from the respective pixels. Note that after the signal voltage is read out through the signal line, the signal voltage is outputted as an output signal to the image processing circuit 22 through an output circuit and an amplifier (both not shown).

Figure 3:
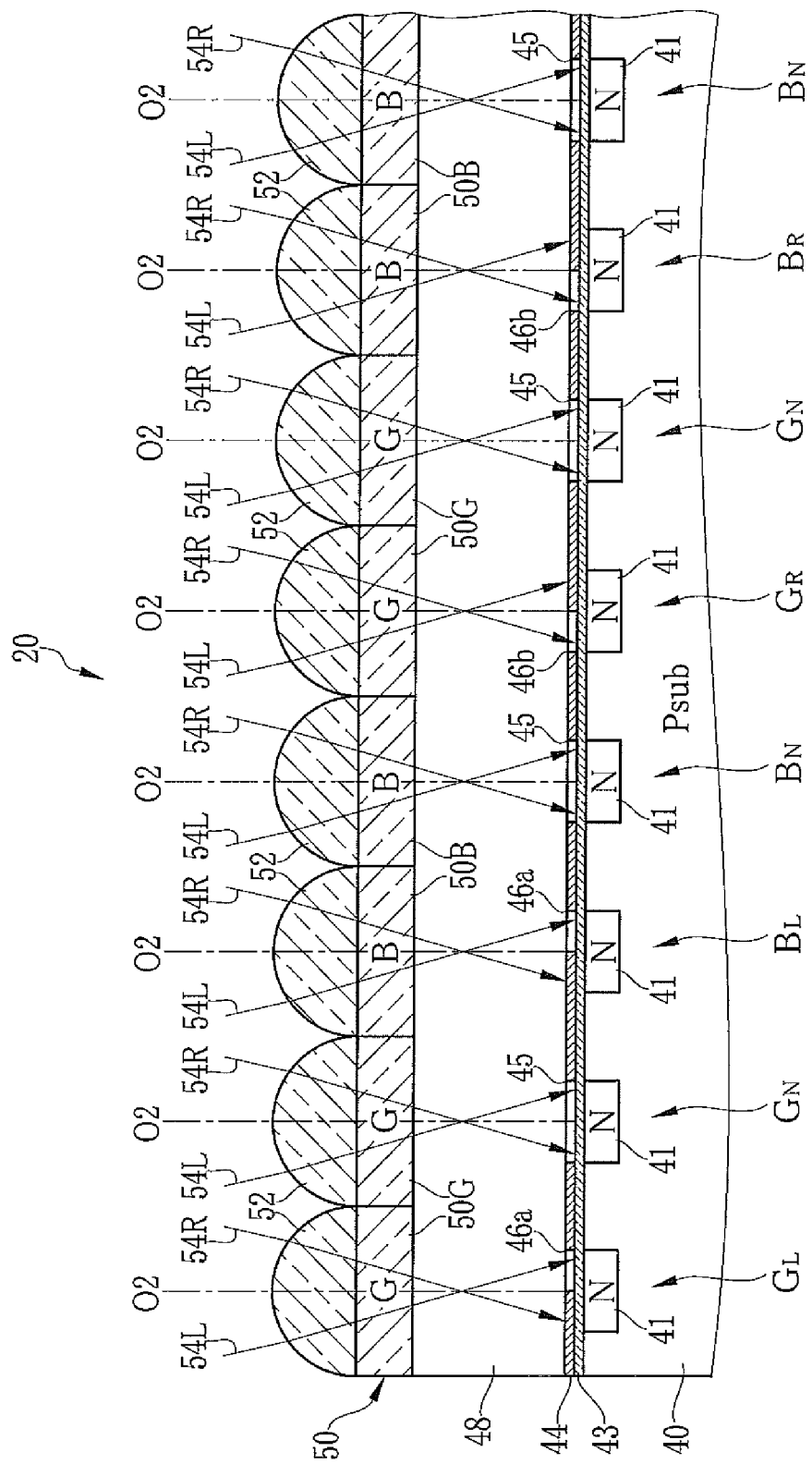
FIG. 3 is a cross-sectional view taken along a line of FIG. 2.
Figure 4:
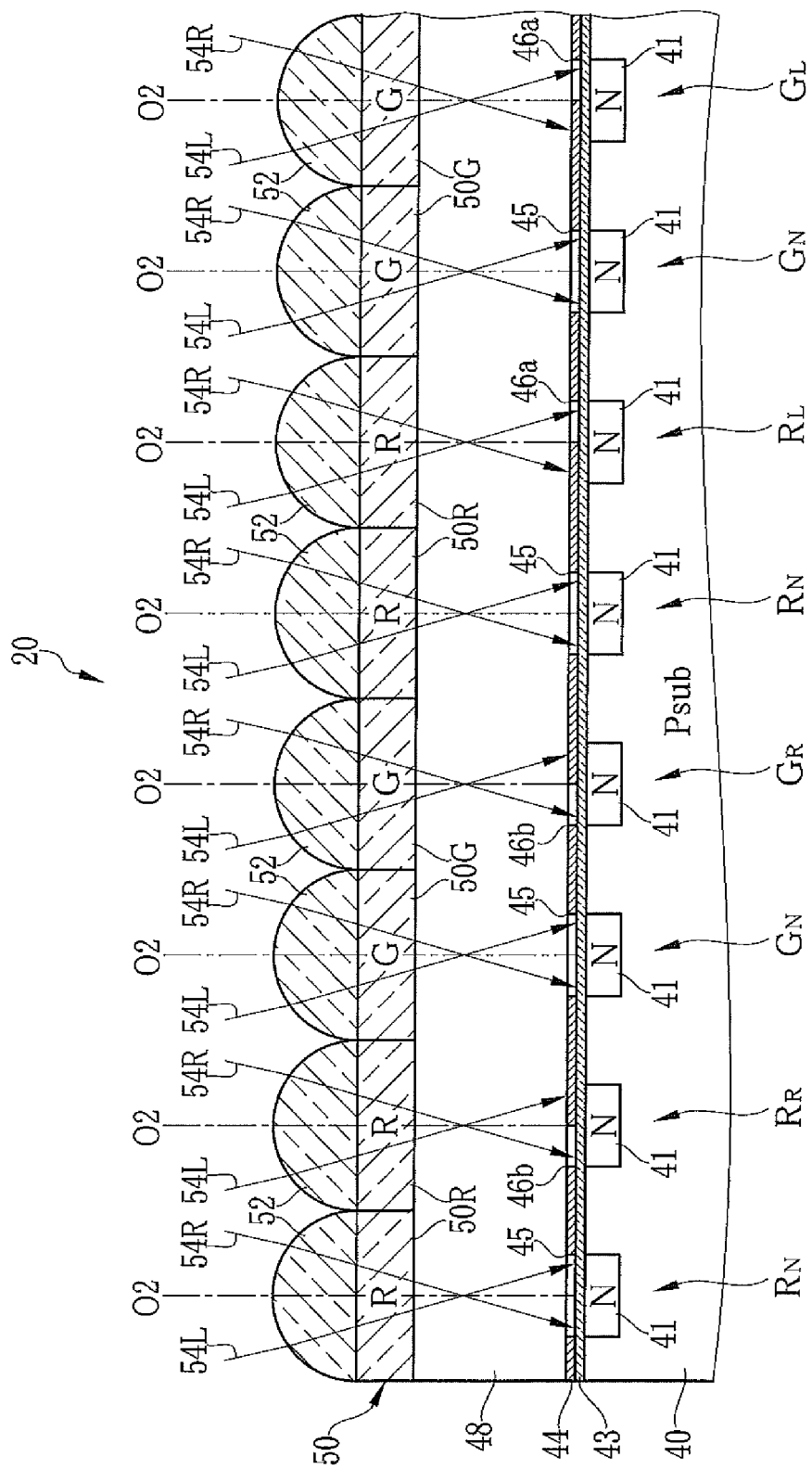
FIG. 4 is a cross-sectional view taken along a line IV-IV of FIG. 2.

In FIGS. 3 and 4, the photodiode (PD) 41 is provided in a surface layer of a semiconductor substrate (Psub) 40. The PD 41 is formed of an N-type layer. The semiconductor substrate 40 is formed of P-type silicon. The above-described pixel circuits (not shown) are formed in the semiconductor substrate 40.

A transparent insulation film 43 is provided over the semiconductor substrate 40. The insulation film 43 is formed of silicon dioxide ($SiO_2$), for example. A light-shield film 44 is provided over the insulation film 43. The light-shield film 44 is formed of tungsten, for example.

Figure 5:
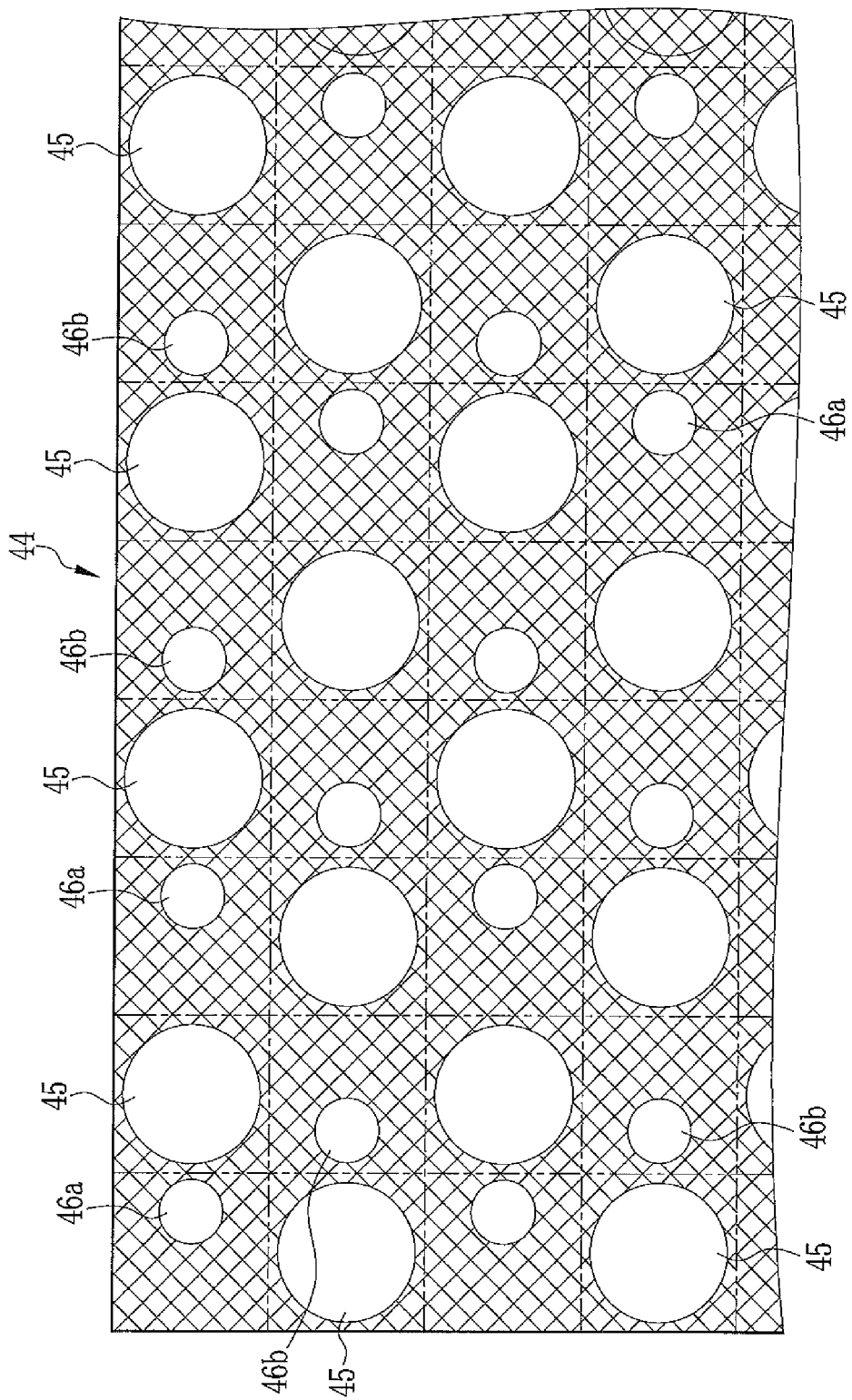
FIG. 5 is a plan view of a light-shield film.

As shown in FIG. 5, normal openings 45, first off-center openings 46a, and second off-center openings 46b are formed through the light-shield film 44. These openings have circular shapes. A diameter of each of the first and the second off-center openings 46a and 46b is smaller than that of the normal opening 45.

The normal openings 45 are provided over the respective normal pixels $R_N$, $G_N$, and $B_N$. The center of the normal opening 45 is located over the center line of the PD 41. Hence, the entire area over the surface of the PD 41 of each of the normal pixels $R_N$, $G_N$, and $B_N$ is exposed.

The first off-center openings 46a are provided over the respective first phase difference pixels $R_L$, $G_L$, and $B_L$. The center of the first off-center opening 46a is shifted in a rightward direction from the center line of the PD 41. Hence, a right area over the surface of the PD 41 of each of the first phase difference pixels $R_L$, $G_L$, and $B_L$ is exposed.

The second off-center openings 46b are provided over the respective second phase difference pixels $R_R$, $G_R$, and $B_R$. The center of the second off-center opening 46b is shifted in a leftward direction from the center line of the PD 41. Hence, a left area over the surface of the PD 41 of each of the second phase difference pixels $R_R$, $G_R$, and $B_R$ is exposed.

A transparent flat-surface planarizing layer 48 is provided over the light-shield film 44. A color filter array 50 is provided over the planarizing layer 48. The color filter array 50 is composed of red color filters 50R, green color filters 50G, and blue color filters 50B.

The red color filter 50R is provided over the PD 41 of each of the normal pixels $R_N$, the first phase difference pixels $R_L$, and the second phase difference pixels $R_R$, and red light is incident on these PDs 41. The green color filter 50G is provided over the PD 41 of each of the normal pixels $G_N$, the first phase difference pixels $G_L$, and the second phase difference pixels $G_R$, and green light is incident on these PDs 41. The blue color filter 50B is provided over the PD 41 of each of the normal pixels $B_N$, the first phase difference pixels $B_L$, and the second phase difference pixels $B_R$, and blue light is incident on these PDs 41.

Microlenses 52 are provided over the color filter array 50 such that optical axes O2 are coincident with the respective center lines of the PDs 41.

Incident light 54L incident on the microlens 52 of each of the normal pixels $R_N$, $G_N$, and $B_N$ from a left oblique direction is collected onto the right area of the each corresponding PD 41. Incident light 54R incident from a right oblique direction is collected onto the left area of the each corresponding PD 41. The normal pixels $R_N$, $G_N$, and $B_N$ are highly sensitive to both of the incident light 54L and the incident light 54R, and are not dependent on directions of the incident light. Note that the incident light along the optical axis O2 is incident on the center of the PD 41.

The incident light 54L is incident on the microlens 52 of each of the first phase difference pixels $R_L$, $G_L$, and $B_L$ from a left oblique direction. The incident light 54L passes through the first off-center opening 46a and is collected onto the right area of the PD 41. However, the incident light 54R, which is incident from a right oblique direction, is blocked by the light-shield film 44. Thus, the first phase difference pixels $R_L$, $G_L$, and $B_L$ are highly sensitive to the incident light 54L.

The incident light 54R is incident on the microlens 52 of each of the second phase difference pixels $R_R$, $G_R$, and $B_R$ from a right oblique direction. The incident light 54R passes through the second off-center opening 46b and is collected onto the left area of the PD 41. However, the incident light 54L, which is incident from a left oblique direction, is blocked by the light-shield film 44. Thus, the second phase difference pixels $R_R$, $G_R$, and $B_R$ are highly sensitive to the incident light 54R.

Figure 6:
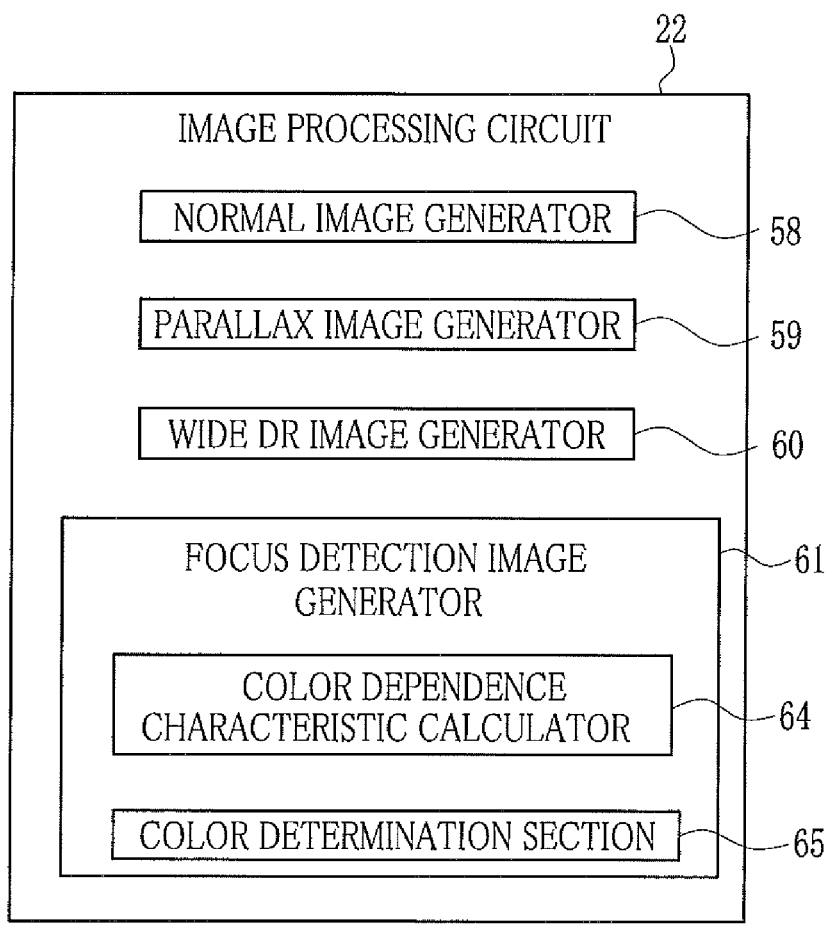
FIG. 6 is a block diagram illustrating an image processing circuit.

In FIG. 6, the image processing circuit 22 has a normal image generator 58, a parallax image generator 59, a wide DR image generator 60, and a focus detection image generator 61.

The normal image generator 58 operates in the normal imaging mode. The normal image generator 58 produces normal image data based on output signals from the normal pixels $R_N$, $G_N$, and $B_N$.

The parallax image generator 59 operates in the parallax imaging mode. The parallax image generator 59 produces L viewpoint image data based on output signals from the first phase difference pixels $R_L$, $G_L$, and $B_L$. The parallax image generator 59 produces R viewpoint image data based on output signals from the second phase difference pixels $R_R$, $G_R$, and $B_R$. Thereby parallax image data having the L and the R viewpoint image data is obtained.

The wide DR image generator 60 operates in the wide DR imaging mode. The wide DR image generator 60 produces wide DR image data based on output signals from all of the normal pixels $R_N$, $G_N$, and $B_N$, the first phase difference pixels $R_L$, $G_L$, and $B_L$, and the second phase difference pixels $R_R$, $G_R$, and $B_R$.

As described above, the diameter of each of the openings of the first and the second off-center openings 46a and 46b is smaller than that of the normal opening 45, so that an amount of incident light on each of the first phase difference pixels $R_L$, $G_L$, and $B_L$ and the second phase difference pixels $R_R$, $G_R$, and $B_R$ is less than an amount of incident light on each of the normal pixels $R_N$, $G_N$, and $B_N$. Hence, the first phase difference pixels $R_L$, $G_L$, and $B_L$ and the second phase difference pixels $R_R$, $G_R$, and $B_R$ are low-sensitivity pixels. The normal pixels $R_N$, $G_N$, and $B_N$ are high-sensitivity pixels. The wide DR image data is obtained by adding the output signals from the low-sensitivity pixels and the output signals from the high-sensitivity pixels. This method is known from Japanese Patent Laid-Open Publication No. 2011-059337 or the like.

Imaging operations are repeated at a predetermined cycle in the normal imaging mode or the wide DR imaging mode. The normal images or the wide DR images are outputted to the display section 32. Thereby the display section 32 displays the through images. In the parallax imaging mode, the L viewpoint images and the R viewpoint images are produced at a predetermined cycle and transmitted to the display section 32. Thereby the display section 32 displays the stereoscopic images. Note that the display section 32 displays one of the L viewpoint image and the R viewpoint image in a case where the display section 32 is not capable of displaying a stereoscopic image. Thus, the two-dimensional or three-dimensional through images are displayed on the display section 32.

The focus detection image generator 61 operates in every imaging mode. The focus detection image generator 61 produces the L focus detection image data and the R focus detection image data based on the output signals from the first phase difference pixels $R_L$, $G_L$, and $B_L$ and the second phase difference pixels $R_R$, $G_R$, and $B_R$. The L focus detection image data and the R focus detection image data is used for the phase-detection AF. To be more specific, the focus detection image generator 61 uses the output signals corresponding to one of red (R), green (G), and blue (B) only, of the output signals from the first phase difference pixels $R_L$, $G_L$, and $B_L$ and the second phase difference pixels $R_R$, $G_R$, and $B_R$, to produce the L focus detection image data and the R focus detection image data.

The focus detection image generator 61 has a color dependence characteristic calculator 64 and a color determination section 65. The color dependence characteristic calculator 64 averages the output signals, outputted from the normal pixels $R_N$, $G_N$, $B_N$ located in a center area of the imaging surface 20a, on a color basis. Thereby the color dependence characteristic calculator 64 calculates an average value (average output signal). To be more specific, a red average output signal $P_R$ is calculated by averaging the output signals from the normal pixels $R_N$ which are located in the center area of the imaging surface 20a. A green average output signal $P_G$ is calculated by averaging the output signals from the normal pixels $G_N$ which are located in the center area of the imaging surface 20a. A blue average output signal $P_B$ is calculated by averaging the output signals from the normal pixels $B_N$ which are located in the center area of the imaging surface 20a.

Based on each of the average output signals $P_R$, $P_G$, and $P_B$ calculated by the color dependence characteristic calculator 64, the color determination section 65 determines one of the red, the green, and the blue colors. To be more specific, the color determination section 65 calculates an output ratio ($P_R/P_B$) between the red average output signal $P_R$ and the blue average output signal $P_B$, an output ratio ($P_R/P_G$) between the red average output signal $P_R$ and the green average output signal $P_G$, and an output ratio ($P_B/P_G$) between the blue average output signal $P_B$ and the green average output signal $P_G$ and compares the output ratios with predetermined values $\alpha$, $\beta$, and $\gamma$. Thereby a color (main color) is determined. In a case where $P_R/P_G > \alpha$ and $P_R/P_G > \beta$, the color is determined to be red. In a case where $P_R/P_B > \alpha$ and $P_R/P_G < \beta$, or in a case where $P_R/P_B < \alpha$ and $P_B/P_G < \gamma$, the color is determined to be green. In a case where $P_R/P_B < \alpha$ and $P_R/P_G > \gamma$, the color is determined to be blue.

Based on the output signals from the pixels corresponding to the color determined by the color determination section 65, of the first phase difference pixels $R_L$, $G_L$, and $B_L$ and the second phase difference pixels $R_R$, $G_R$, and $B_R$, the focus detection image generator 61 produces the L focus detection image data and the R focus detection image data. For example, in a case where the color is determined to be red, the first phase difference pixels $R_L$ and the second phase difference pixels $R_R$ are used to produce the L focus detection image data and the R focus detection image data. The L and the R focus detection image data is outputted to the AF detector 26.

It is preferable that each of the predetermined values $\alpha$, $\beta$, and $\gamma$ is greater than "1". In this case, the color determination section 65 determines the main color of the subject, and the L-focus detection image data and the R-focus detection image data is produced based on the output signals from the first and the second phase difference pixels corresponding to the determined color. For example, in a case where the main color of a main subject located at the center of the screen is green, the color is determined to be green by the color determination section 65. Thereby, the focus adjustment amount is calculated accurately even for a main subject with a biased or dominant color.

Figure 7:
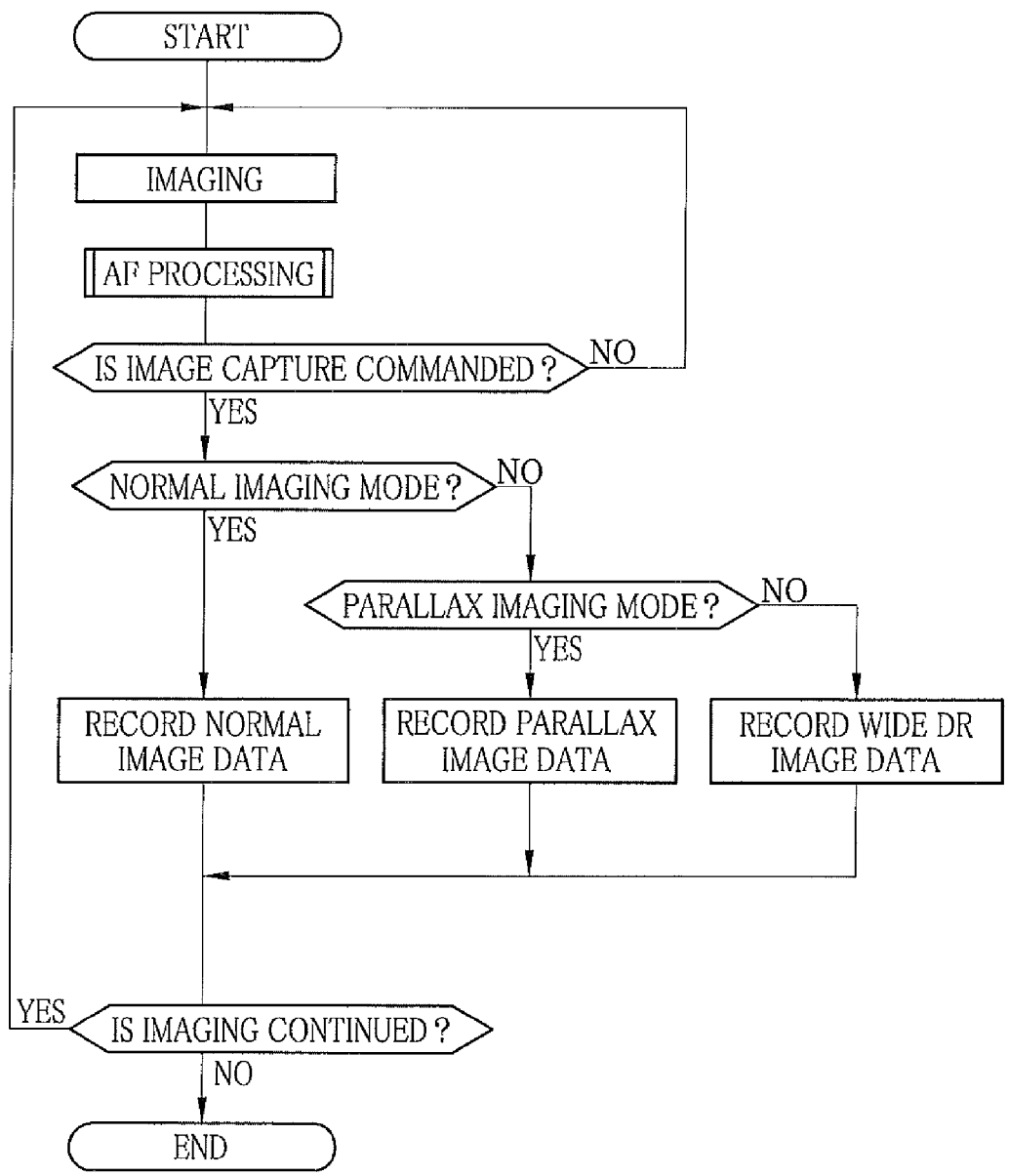
FIG. 7 is a flowchart illustrating steps of imaging.
Figure 8:
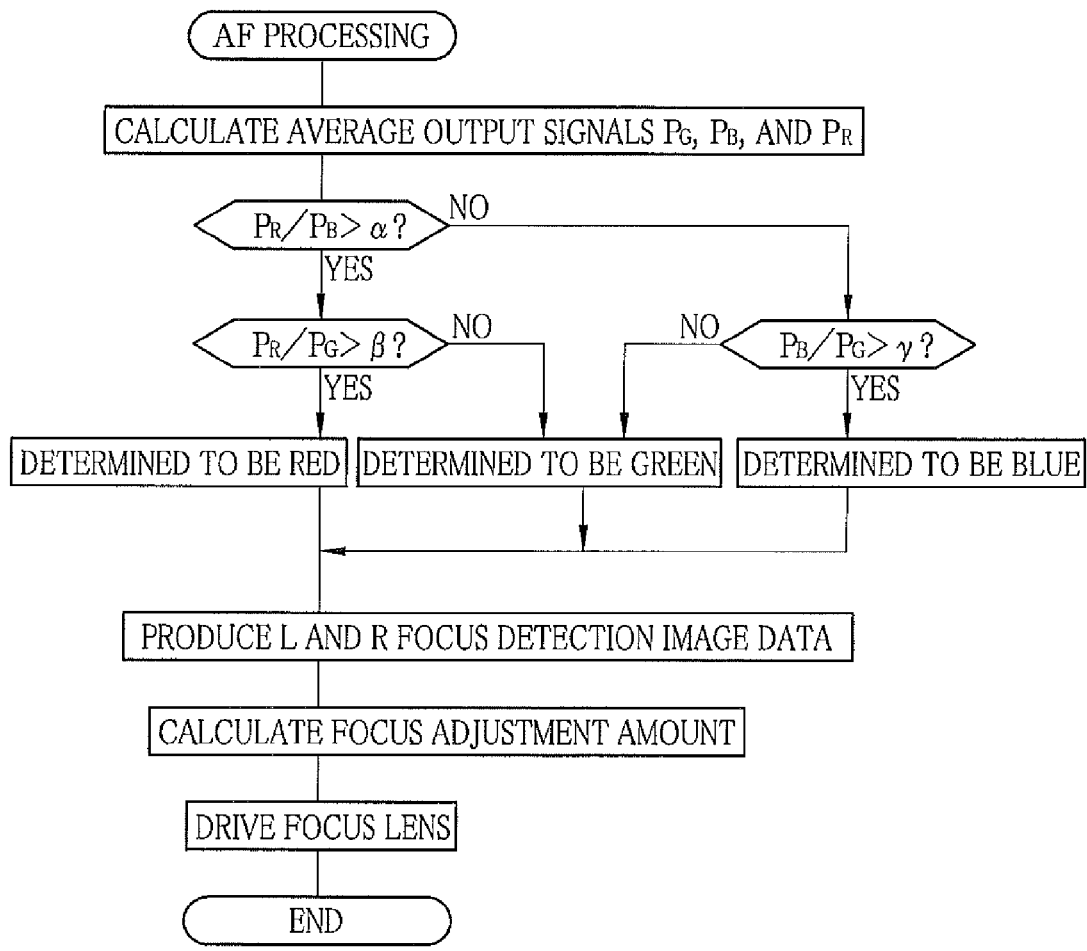
FIG. 8 is a flowchart illustrating AF processing.

Next, an operation of the digital camera 10 is described with reference to flowcharts of FIGS. 7 and 8. When one of the normal imaging mode, the parallax imaging mode, and the wide DR imaging mode is chosen using the operation unit 12, the CPU 11 controls the operation of the mechanical shutter 15 through the lens driver 21, and drives the solid-state imaging device 20 through the CMOS driver 23.

Light from the subject is incident on the solid-state imaging device 20 when the mechanical shutter 15 is open. The PD 41 of each of the normal pixels $R_N$, $G_N$, and $B_N$, the first phase difference pixels $R_L$, $G_L$, and $B_L$, and the second phase difference pixels $R_N$, $G_R$, and $B_R$ photoelectrically converts the incident light into a signal charge and stores it. Under the control of the CMOS driver 23, the pixel circuit reads out the signal charges in time series as signal voltages. The each read-out signal voltage is outputted as an imaging signal from the solid-state imaging device 20 through the output circuit (not shown). The imaging signal passes through the amplifier and an A/D converter (both not shown) and then transmitted as an image signal to the image processing circuit 22.

The image processing circuit 22 performs image processing (gradation conversion, white balance correction, gamma correction, color correction, and the like) on the image signal of each color. The imaging mode is set to the normal imaging mode in an initial state, so that the image data of the three colors is transmitted to the normal image generator 58 after the image processing. The normal image generator 58 produces the through images before image capture. The through images are displayed on the display section 32.

The color dependence characteristic calculator 64 of the image processing circuit 22 averages the output signals from the normal pixels $R_N$, $G_N$, and $B_N$ which are located in the center area of the imaging surface 20a, on a color basis, while the through images are displayed. Thereby the color dependence characteristic calculator 64 calculates the average output signals $P_G$, $P_B$, and $P_R$. The average output signals $P_G$, $P_B$, and $P_R$ are transmitted to the color determination section 65.

Based on the average output signals $P_G$, $P_B$, and $P_R$, the color determination section 65 determines that the main color of the subject is red in a case where $P_R/P_B > \alpha$ and $P_R/P_G > \beta$. The color determination section 65 determines that the main color of the subject is green in a case where $P_R/P_B > \alpha$ and $P_R/P_5 < \beta$, or in a case where $P_R/P_B < \alpha$ and $P_B/P_G < \gamma$. The color determination section 65 determines that the main color of the subject is blue in a case where $P_R/P_B < \alpha$ and $P_B/P_G > \gamma$.

In a case where the color determination section 65 determines that the main color is red, the focus detection image generator 61 uses the first phase difference pixels $R_L$ of the entire area to produce the L focus detection image data and uses the second phase difference pixels $R_N$ of the entire area to produce the R focus detection image data. Similarly, in a case where the color determination section 65 determines that the main color is green, the focus detection image generator 61 uses the first phase difference pixel $G_L$ to produce the L focus detection image data and uses the second phase difference pixel $G_R$ to produce the R focus detection image data. In a case where the color determination section 65 determines that the main color is blue, the focus detection image generator 61 uses the first phase difference pixel $B_L$ to produce the L focus detection image data and uses the second phase difference pixel $B_R$ to produce the R focus detection image data. The L focus detection image and the R focus detection image coincide when they are in focus. When out of focus, the L focus detection image and the R focus detection image are shifted in a right-left direction in accordance with a degree of out of focus.

The AF detector 26 analyzes the L focus detection image data and the R focus detection image data to calculate a direction and an amount of the shift between the L focus detection image and the R focus detection image. Thereby the AF detector 26 calculates the focus adjustment amount (amount of defocus) of the lens unit 13.

Based on the focus adjustment amount calculated by the AF detector 26, the AF controller 27 allows the focus mechanism 19 to move the focus lens 17 in the optical axis direction, through the lens driver 21. Thereby the AF controller 27 performs the focus adjustment. Note that the direction of moving the focus lens 17 is determined based on the sign (positive/negative) of the focus adjustment amount. The phase detection AF is described in detail in Japanese Patent No. 2959142, Japanese Patent Laid-Open Publication Nos. 2009-128892, 2007-158597, and the like, so that descriptions thereof are omitted. The AF control is repeated at a predetermined cycle while the through images are displayed.

When a shutter release button of the operation unit 12 is pressed to command image capture, each pixel of the solid-state imaging device 20 is reset forcedly. Then each pixel starts storing the signal charge. When the exposure time corresponding to the brightness of the subject elapses, the mechanical shutter 15 closes to end the exposure. Thereafter, an output signal of one frame is taken out from the solid-state imaging device 20. The normal image generator 58 produces the normal image data. The normal image data is compressed in the compression/decompression circuit 29 and then recorded in the memory card 31 through the media I/F 30. Note that, after the signal is taken out from the solid-state imaging device 20, the mechanical shutter 15 opens. Thereby capturing through images resumes.

In the parallax imaging mode, the parallax image generator 59 produces the L viewpoint image data and the R viewpoint image data. The L viewpoint image data and the R viewpoint image data is compressed as the parallax image data into an image file and stored in the memory card 31. In the wide DR imaging mode, the wide DR image generator 60 produces the wide DR image data. The wide DR image data is compressed and then recorded in the memory card 31.

Note that the sensitivities of the first phase difference pixels $R_L$, $G_L$, and $B_L$ and the second phase difference pixels $R_R$, $G_R$, and $B_R$ are dependent on the directions of the incident light due to the use of the first and the second off-center openings 46a and 46b. Instead, the dependence on the direction(s) of the incident light may be given by changing the shape or arrangement of the microlenses.

Figure 9:
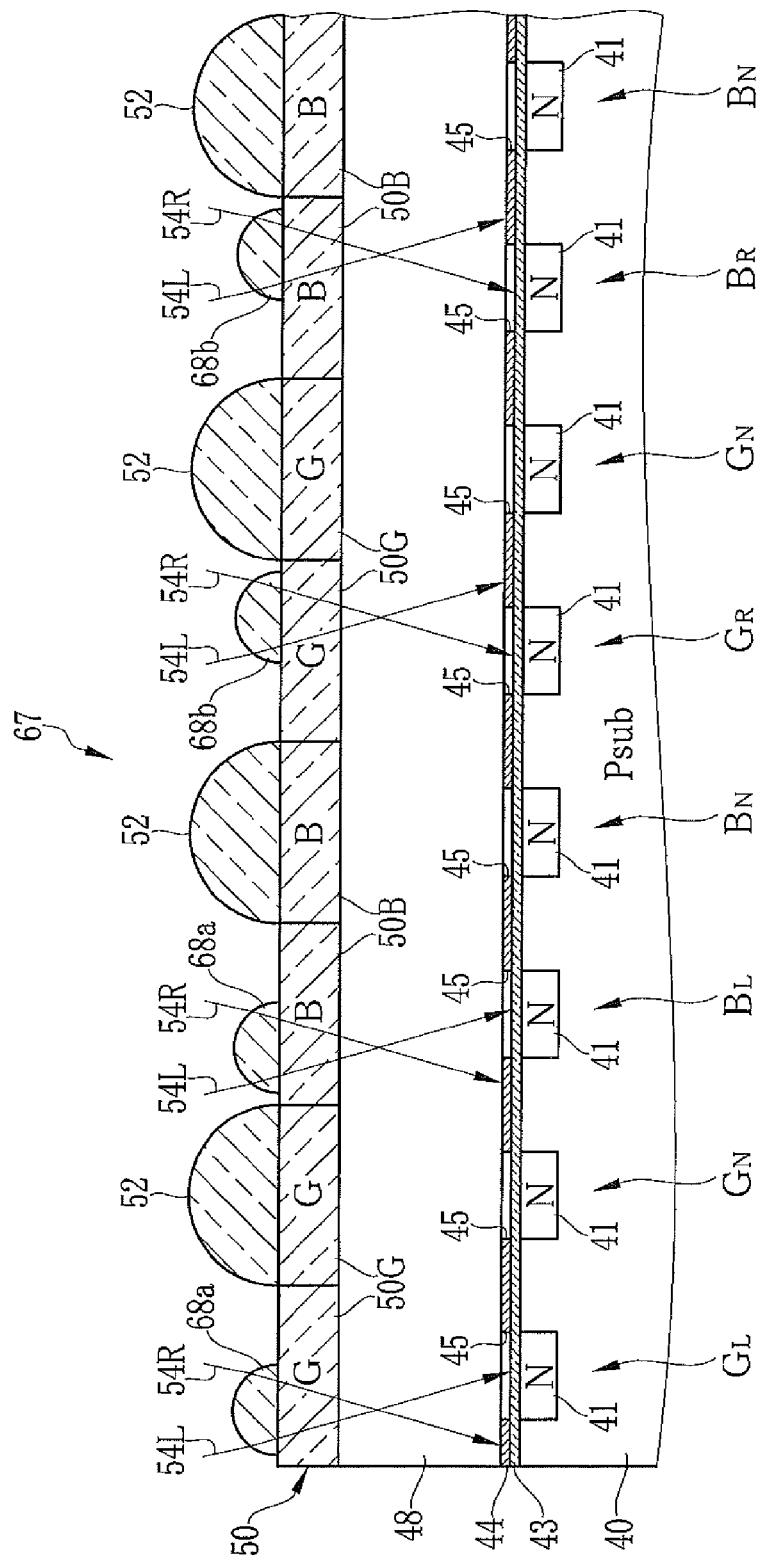
FIG. 9 is a cross-sectional view illustrating a modified example of the first and the second phase difference pixels.

For example, in a solid-state imaging device 67 shown in FIG. 9, the first phase difference pixels $R_L$, $G_L$, and $B_L$ have respective first off-center microlenses 68a. The second phase difference pixels $R_R$, $G_R$, and $B_R$ have respective second off-center microlenses 68b. The first phase difference pixels $R_L$, $G_L$, and $B_L$ and the second phase difference pixels $R_R$, $G_R$, and $B_R$ have the respective normal openings 45. Each of the off-center microlenses 68a and 68b is smaller than the microlens 52 for the normal pixels $R_N$, $G_N$, and $B_N$.

The first off-center microlens 68a is formed in a position which is shifted in a leftward direction from the center of the PD 41 located below the first off-center microlens 68a. The first off-center microlens 68a collects the incident light 54L onto the PD 41 located below the first off-center microlens 68a. The second off-center microlens 68b is formed in a position shifted in a rightward direction from the center of the PD 41 located below the second off-center microlens 68b. The second off-center microlens 68b collects the incident light 54R onto the PD 41 located below the second off-center microlens 68b. Thereby the first phase difference pixels $R_L$, $G_L$, and $B_L$ are highly sensitive to the incident light 54L. The second phase difference pixels $R_R$, $G_R$, and $B_R$ are highly sensitive to the incident light 54R.

In the solid-state imaging device 20 shown in FIG. 2, the first and second phase difference pixels are arranged in a diagonal direction in each pixel block of 2×2. The arrangement is not limited as long as the two pixels out of the four pixels in each pixel block are the first and the second phase difference pixels.

Figure 10:
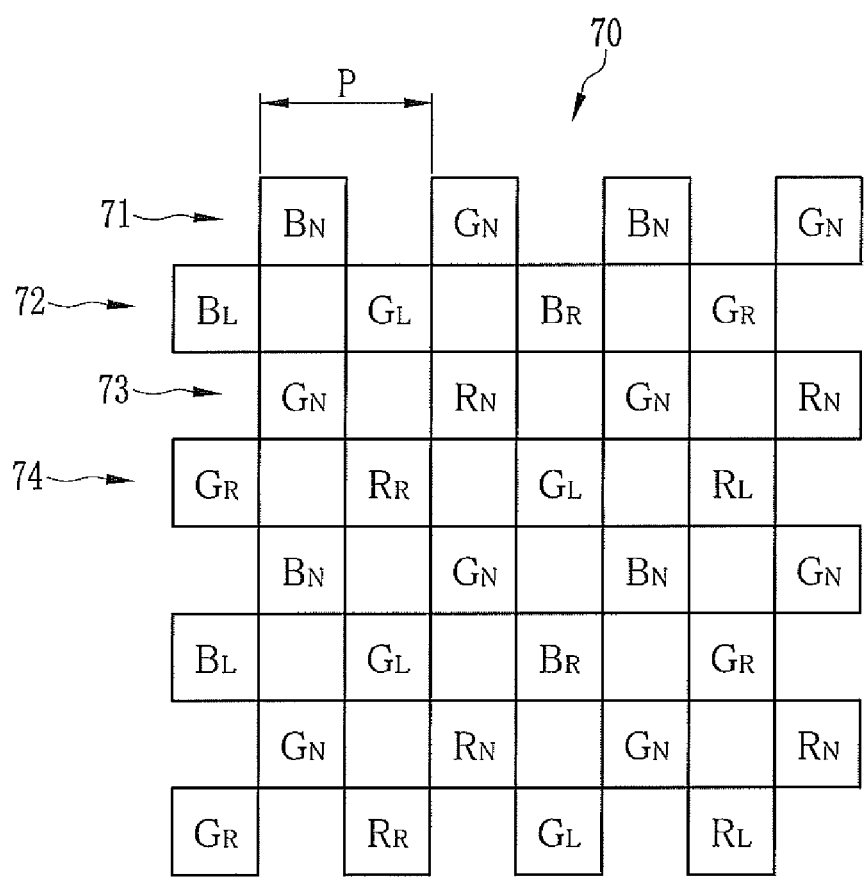
FIG. 10 is a plan view illustrating another example of a solid-state imaging device.

Next, another example of a solid-state imaging device is described with the use of FIG. 10. In a solid-state imaging device 70, the pixels are arranged in a so-called EXR arrangement pattern. The solid-state imaging device 70 has first pixel rows 71, second pixel rows 72, third pixel rows 73, and fourth pixel rows 74. The first to the fourth pixel rows 71 to 74 are repeatedly arranged in this order in a column direction. In the first pixel row 71, the normal pixels $B_N$ and the normal pixels $G_N$ are arranged alternately at a pitch P. In the second pixel row 72, the first phase difference pixel $B_L$, the first phase difference pixel $G_L$, the second phase difference pixel $B_R$, and the second phase difference pixel $G_R$ are repeatedly arranged in this order at the pitch P. In the third pixel row 73, the normal pixels $G_N$ and the normal pixels $R_N$ are arranged alternately at the pitch P. In the fourth pixel row 74, the first phase difference pixel $G_R$, the first phase difference pixel $R_R$, the second phase difference pixel $G_L$, and the second phase difference pixel $R_L$ are repeatedly arranged in this order at the pitch P.

The first phase difference pixels $R_L$, $G_L$, and $B_L$, and the second phase difference pixels $R_R$, $G_R$, and $B_R$ are located in even-numbered rows, and arranged in positions shifted by a half pitch (P/2) in a row direction relative to the normal pixels $R_N$, $G_N$, and $B_N$ located in the odd-numbered rows. Namely, a square matrix of the first phase difference pixels $R_L$, $G_L$, and $B_L$ and the second phase difference pixels $R_R$, $G_R$, and $B_R$ is shifted from a square matrix of the normal pixels $R_N$, $G_N$, and $B_N$ by a half pitch in each of the row and the column directions. Note that the normal pixels $R_N$, $G_N$, and $B_N$, the first phase difference pixels $R_L$, $B_L$, and the second phase difference pixels $R_R$, $G_R$, and $B_R$ are the same as those shown in FIGS. 3 to 5.

The solid-state imaging device 70 produces the L and the R focus detection images, the normal images, the parallax image, and the wide DR images in a manner similar to the solid-state imaging device 20.

The pixels of the solid-state imaging device may be arranged in various arrangement patterns such as a honeycomb arrangement pattern instead of the EXR arrangement pattern.

The display section 32, such as a liquid crystal display, capable of displaying a two-dimensional image or a three-dimensional image is used. A lenticular method, a parallax barrier method, an anaglyphic method, a frame sequential method, a light direction method or the like is used to display the three-dimensional image.

In the above embodiments, the color dependence characteristic calculator 64 averages the output signals from the normal pixels $R_N$, $G_N$, $B_N$ which are located in the center area of the imaging surface 20a, for each color of the color filters. Thereby the color dependence characteristic calculator 64 calculates the average output signals $P_R$, $P_G$, and $P_B$. The output signals from the normal pixels $R_N$, $G_N$, and $B_N$ located in an area other than the center area or of the entire area may be averaged to calculate the average output signals $P_R$, $P_G$, and $P_B$.

The color dependence characteristic calculator 64 may average the output signals from the first phase difference pixels $R_L$, $G_L$, and $B_L$ and the second phase difference pixels $R_R$, $G_R$, and $B_R$, in addition to the output signals from the normal pixels $R_N$, $G_N$, and $B_N$, to calculate the average output signals $P_R$, $P_G$, and $P_B$. The color dependence characteristic calculator 64 may average the output signals from the first phase difference pixels $R_L$, $G_L$, and $B_L$ and the second phase difference pixels $R_R$, $G_R$, and $B_R$ only, to calculate the average output signals $P_R$, $P_G$, and $P_B$. The color dependence characteristic calculator 64 may calculate a value other than the average value of the output signals. The color dependence characteristic calculator 64 may calculate an integrated value or the like of the output signals.

In the above embodiments, the color dependence characteristic calculator 64 and the color determination section 65 are provided in the image processing circuit 22. The color dependence characteristic calculator 64 and the color determination section 65 may be provided in the solid-state imaging device 20, 67, or 70 or the CPU 11.

In addition to the normal imaging mode, the parallax imaging mode, and the wide DR imaging mode, a high-speed imaging mode may be provided. The high-speed imaging mode is a mode for performing so-called thinning readout, in which pixels of the odd-numbered rows or the even-numbered rows of the solid-state imaging device 20 are read out, for example. Note that, in a pixel arrangement shown in FIG. 2, some of the normal pixels $R_N$, $G_N$, $B_N$, the first phase difference pixels $R_L$, $G_L$, and $B_L$, and the second phase difference pixels $R_R$, $G_R$, and $B_R$ are included in each of the odd-numbered rows and the even-numbered rows. Hence, the high-speed imaging mode enables reading out the normal image, the parallax image, and the wide DR image at high-speed. Note that, in the high-speed imaging mode, imaging is performed in a short time though the resolution is reduced.

In the above embodiments, the phase difference pixels are selected in accordance with the main color of the subject. Alternatively, values of α, β, and γ may be determined such that the green color is chosen in normal cases. In a case where the red color of the subject is considerably strong, the red color is chosen. In a case where the blue color of the subject is considerably strong, the blue color is chosen. The AF control is performed using the phase difference pixels of the chosen color. Only the phase difference pixels located in the center of the screen, that is, the center of the imaging surface of the solid-state imaging device may be used for the AF control.

The solid-state imaging devices 20, 67, and 70 have the primary color filters 50R, 50G, and 50B of red, green, and blue. Instead, complementary color filters of yellow, magenta, and cyan may be used. The color filters of four or more colors may be used. The solid-state imaging devices 20, 67, and 70 are not limited to the CMOS type. The solid-state imaging devices 20, 67, and 70 may be of a CCD type.

Various changes and modifications are possible in the present invention and may be understood to be within the present invention.

What is claimed is:

1. A digital camera comprising:
a taking lens for forming an image of a subject;
a solid-state imaging device having an imaging surface on which three types of pixels are arranged, the three types of pixels being a plurality of normal pixels having sensitivity not dependent on an incident direction of light, a plurality of first phase difference pixels highly sensitive to light of a first incident direction, and a plurality of second phase difference pixels highly sensitive to light of a second incident direction opposite to the first incident direction, the each pixel having a color filter of one of at least three primary colors;
a color dependence characteristic calculator for performing calculation of one of or both of output signals from the normal pixels and output signals from the first and the second phase difference pixels, on a color basis, to calculate a color dependence characteristic of the output signal, after a color image of the subject is captured;

a color determination section for determining a specific color based on the color dependence characteristic;

an autofocus detector for obtaining a focus adjustment amount of the taking lens based on the output signal from the pixel having the color filter of the specific color, out of the first and the second phase difference pixels; and a focus mechanism for setting the taking lens to an in-focus position in accordance with the focus adjustment amount.

2. The digital camera of claim 1, wherein the color dependence characteristic calculator averages the output signals from the pixels, for each color of red, green, and blue constituting the three primary colors, to calculate a red average output signal $P_R$, a green average output signal $P_G$, and a blue average output signal $P_B$, and the specific color is determined from magnitude of output ratios between the average output signals of the two colors, $P_R/P_B$, $P_R/P_G$, and $P_B/P_G$.

3. The digital camera of claim 1, wherein the color dependence characteristic calculator uses the output signal from the each pixel located in a center area of the imaging surface, to calculate the color dependence characteristic.

4. The digital camera of claim 1, further comprising a normal image generator for producing a two-dimensional normal image based on the output signals from the normal pixels.

5. The digital camera of claim 4, further comprising a wide dynamic range image generator for producing a wide dynamic range image based on the output signals from the normal pixels and the output signals from the first and the second phase difference pixels, and a dynamic range of the wide dynamic range image is wider than a dynamic range of the normal image.

6. The digital camera of claim 5, further comprising a parallax image generator for producing a parallax image based on the output signals from the first and the second phase difference pixels.

7. The digital camera of claim 1, wherein the pixels on the imaging surface are arranged in pixel blocks of 2×2, and the each pixel block has the two normal pixels and the first and the second phase difference pixels.

8. The digital camera of claim 7, wherein the three primary colors are a first color, a second color, and a third color, and the each pixel block has color filters of the same color.

9. The digital camera of claim 8, wherein the pixel blocks are categorized into six types: a first first-color pixel block, a second first-color pixel block, a first second-color pixel block, a second second-color pixel block, a first third-color pixel block, and a second third-color pixel block, and the first first-color pixel block is composed of the two normal pixels arranged in a first diagonal direction and the first and the second phase difference pixels arranged in a second diagonal direction, and has the color filters of the first color, and the second first-color pixel block has the first and the second phase difference pixels with their positions reversed from positions of the first and the second phase difference pixels in the first first-color pixel block, and the first second-color pixel block is composed of the two normal pixels arranged in the first diagonal direction and the first and second phase difference pixels arranged in the second diagonal direction, and has the color filters of the second color, and the second second-color pixel has the first and the second phase difference pixels with their positions reversed from positions of the first and the second phase difference pixels in the first second-color pixel block, and the first third-color pixel block is composed of the two normal pixels arranged in the first diagonal direction and the first and the second phase difference pixels arranged in the second diagonal direction, and has the color filters of the third color, and the second third-color pixel block has the first and the second phase difference pixels with their positions reversed from positions of the first and the second phase difference pixels in the first third-color pixel block.

10. The digital camera of claim 9, wherein the digital camera has first pixel block rows and second pixel block rows arranged alternately in a column direction, and the first pixel block row has the first first-color pixel block, the first second-color pixel block, the second first-color pixel block, and the second second-color pixel block repeatedly arranged in this order, and the second pixel block row has the first second-color pixel block, the first third-color pixel block, the second second-color pixel block, the second third-color pixel block repeatedly arranged in this order.

11. The digital camera of claim 10, wherein the first color is green, and the second color is blue, and the third color is red.

12. The digital camera of claim 1, wherein the normal pixels are arranged at a predetermined pitch in odd-numbered rows, and the first and the second phase difference pixels are arranged at the predetermined pitch in even-numbered rows, and the first and the second phase difference pixels are arranged in positions shifted by a half pitch in a row direction relative to positions of the normal pixels.

13. The digital camera of claim 12, wherein the three primary colors are a first color, a second color, and a third color; the digital camera has first to fourth pixel rows; the normal pixels having the color filters of the first color and the normal pixels having the color filters of the second color are arranged alternately at the predetermined pitch in the first pixel row; the first phase difference pixel having the color filter of the first color, the first phase difference pixel having the color filter of the second color, the second phase difference pixel having the color filter of the first color, and the second phase difference pixel having the color filter of the second color are repeatedly arranged in this order at the predetermined pitch in the second pixel row; the normal pixels having the color filters of the second color and the normal pixels having the color filters of the third color are arranged alternately at the predetermined pitch in the third pixel row; the first phase difference pixel having the color filter of the second color, the first phase difference pixel having the color filter of the third color, the second phase difference pixel having the color filter of the second color, and the second phase difference pixel having the color filter of the third color are repeatedly arranged in this order at the predetermined pitch in the fourth pixel row; and the first to the fourth pixel rows are repeatedly arranged in this order in a column direction.

14. The digital camera of claim 13, wherein the first color is blue, the second color is green, and the third color is red.

15. The digital camera of claim 1, wherein each of the normal pixels, the first phase difference pixels, and the second phase difference pixels has a photodiode, a light-shield film, and a microlens disposed over the color filter, and the light-shield film has a normal opening formed over a center of the photodiode of the normal pixel, a first off-center opening formed in a position shifted in one direction from above a center of the photodiode of the first phase difference pixel, and a second off-center opening formed in a position shifted in another direction, opposite to the one direction, from above a center of the photodiode of the second phase difference pixel.

16. The digital camera of claim 1, wherein the each normal pixel has a photodiode, an opening formed through a light-shield film over the photodiode, and a microlens disposed over a center line of the opening, and the each first phase difference pixel has a photodiode, an opening formed through the light-shield film over the photodiode, and a microlens shifted in one direction from a center line of the opening and having a small diameter; and the each second phase difference pixel has a photodiode, an opening formed through the light-shield film over the photodiode, and a microlens shifted in another direction, opposite to the one direction, from a center line of the opening and having a small diameter.

* * * * *